Figure 1:
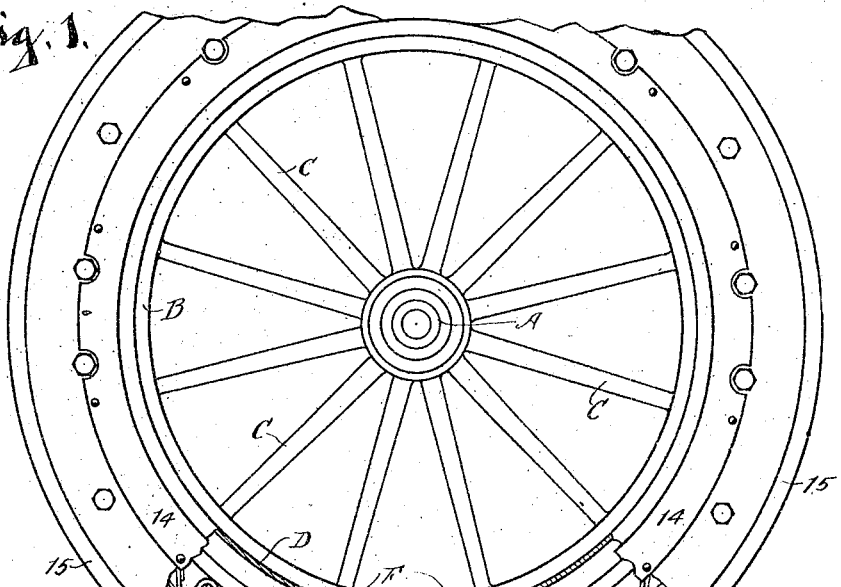

J. C. STREIBICH.
RESILIENT WHEEL.
APPLICATION FILED MAR. 17, 1915.

1,165,463.

Patented Dec. 28, 1915.

Witnesses.
E. Goesling
A. Johnson

Inventor.
John C. Streibich
by C. Speigel Atty

UNITED STATES PATENT OFFICE.

JOHN C. STREIBICH, OF LITTLE ROCK, ARKANSAS.

RESILIENT WHEEL.

1,165,463.  Specification of Letters Patent.  Patented Dec. 28, 1915.

Application filed March 17, 1915.  Serial No. 14,998.

*To all whom it may concern:*

Be it known that I, JOHN C. STREIBICH, residing at Little Rock, Pulaski county, State of Arkansas, have invented certain new and useful Improvements in Resilient Wheels, of which the following is a clear, full, and exact description, attention being called to the drawing which accompanies this application and forms a part thereof.

This invention relates to improvements in the construction of vehicle wheels in which springs are used in place of pneumatic tires, to impart resiliency to counteract the effects of travel over the ground.

Figure 2:
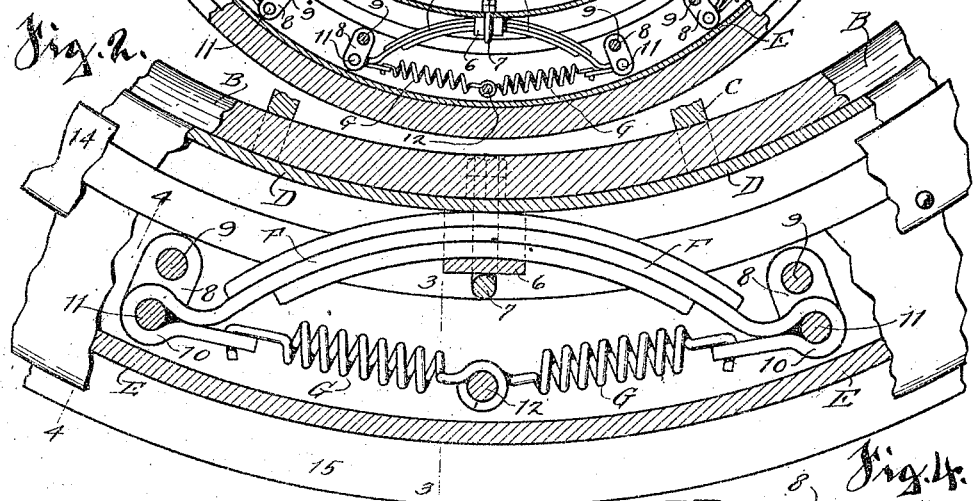
Figures 3, 4:
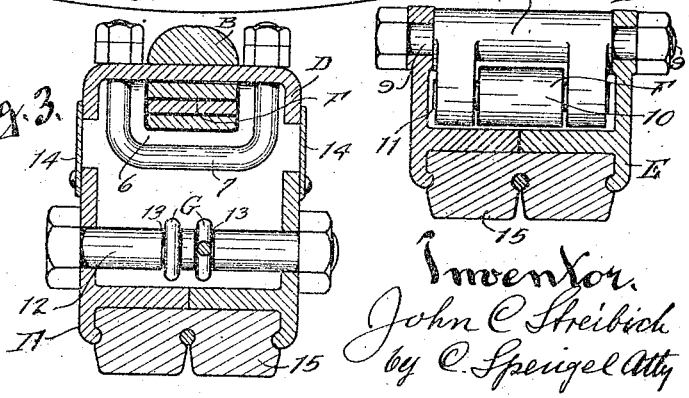

The invention consists of the particular construction hereinafter described and claimed and illustrated in the accompanying drawing, in which:

Figure 1, illustrates my improved wheel in side elevation, and with parts broken away. Fig. 2, shows a portion of Fig. 1, at enlarged scale. Fig. 3, is a cross-section taken on a line indicated at 3—3 in Fig. 2. Fig. 4, is another cross-section taken on a line 4—4 in Fig. 2.

In the drawing, letter A indicates the hub, letter B indicates the felly, and letter C indicates the spokes whereby hub and felly are connected and positioned with reference to each other. Around the felly there is an inner rim D and around it and spaced therefrom, there is an outer rim E. The wheel travels upon this outer rim and between it and the inner rim there are composite springs to render the contact resilient.

The rims are channel or U-shaped, and positioned with their open part opposite each other as shown in Fig. 3, to provide a space for the reception of these springs. These latter consist of leaf springs F, connected between their ends to the inner rim and at their ends to the outer rim. The first connection is by means of a U-shaped bearing 6 in which the springs are mounted on the inner rim by means of a clip 7. The other connection is by links 8 supported by means of pins 9 in the outer rim.

One of the leaves of each leaf-spring, is extended in both directions and shaped at its ends to form loops 10, adapted to receive pins 11 carried in the links. The action of the leaf springs is increased by means of coil springs G, two being used with each leaf spring, and extending between their ends. At one of their ends they connect to a pin 12, seated in the outer rim, midway between the links, said pin being grooved as shown at 13 to receive the springs. At their other ends one coil spring connects to one end of the leaf spring and the other one connects to the other end thereof.

As will now be seen, the wheel may vibrate within the outer rim when under load and is also cushioned by the springs which yield to the contact with the road bed.

The space between the rims is closed by a suitable annular cover 14. A cushion tire is indicated at 15.

Having described my invention, I claim as new:

In a resilient wheel, the combination of an inner rim, an outer rim spaced therefrom, leaf springs between the rims, a bearing whereby each leaf spring is connected between its ends to the inner rim, pins mounted transversely in the outer rim, one opposite each of the bearings mentioned, a coil spring connected at one of its ends to each of these pins and at its other end to one end of each of the leaf springs, another coil spring also connected at one of its ends to each of said pins and at its other end to the other end of each of the leaf springs, links whereby the leaf springs and the coil springs are supported at their ends where they are connected to each other, and pins whereby these links are mounted in the outer rim.

In testimony whereof I hereby affix my signature in the presence of two witnesses.

JOHN C. STREIBICH.

Witnesses:
 ANDREW H. SCOTT,
 SAM LATKIN.